US012365331B2

(12) United States Patent
Nakashima

(10) Patent No.: US 12,365,331 B2
(45) Date of Patent: Jul. 22, 2025

(54) CONTROL DEVICE, CONTROL METHOD, AND STORAGE MEDIUM STORING CONTROL PROGRAM

(71) Applicant: HONDA MOTOR CO., LTD., Tokyo (JP)

(72) Inventor: Hiroyuki Nakashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 18/227,121

(22) Filed: Jul. 27, 2023

(65) Prior Publication Data
US 2024/0042990 A1    Feb. 8, 2024

(51) Int. Cl.
*B60W 30/06*    (2006.01)
*B60W 50/14*    (2020.01)

(52) U.S. Cl.
CPC ............ *B60W 30/06* (2013.01); *B60W 50/14* (2013.01); *B60W 2420/403* (2013.01); *B60W 2552/00* (2020.02)

(58) Field of Classification Search
CPC ....... B60W 2420/403; B60W 2552/00; B60W 2556/35; B60W 30/06; B60W 50/14; B62D 15/0285
See application file for complete search history.

(56) References Cited

U.S. PATENT DOCUMENTS

| 10,242,575 | B1 * | 3/2019 | Chan ...................... G08G 1/142 |
| 11,613,273 | B2 * | 3/2023 | Matsunaga ............... B60R 1/27 |
| | | | 701/25 |
| 12,139,130 | B2 * | 11/2024 | Tagawa .............. B62D 15/0275 |
| 2009/0207045 | A1 * | 8/2009 | Jung ......................... G06T 7/74 |
| | | | 340/932.2 |
| 2013/0166190 | A1 * | 6/2013 | Ikeda ........................ B60R 1/27 |
| | | | 701/400 |

(Continued)

FOREIGN PATENT DOCUMENTS

| CN | 111508260 A | * | 8/2020 | |
| DE | 102013015348 A1 | * | 4/2014 | ............... B62D 1/02 |

(Continued)

*Primary Examiner* — Babar Sarwar
(74) *Attorney, Agent, or Firm* — Paratus Law Group, PLLC

(57) ABSTRACT

A control device includes a control unit that executes automatic parking control for parking the moving body at the parking position based on recognition data of an external environment of a moving body and the parking position and registers the parking position as a designated parking position. The control unit executes first registration of registering the designated parking position based on first recognition data and executes second registration of registering the designated parking position based on second recognition data. The control unit continues the second registration without executing automatic movement control when execution of the automatic movement control is instructed during execution of the second registration in new registration of the designated parking position. The control unit suspends the second registration and executes the automatic movement control when execution of the automatic movement control is instructed during execution of the second registration in update of the designated parking position.

12 Claims, 11 Drawing Sheets

(56) References Cited

U.S. PATENT DOCUMENTS

| | | | |
|---|---|---|---|
| 2017/0118307 A1* | 4/2017 | Beaurepaire | H04W 4/40 |
| 2018/0308358 A1* | 10/2018 | Hayakawa | G06V 20/586 |
| 2018/0364696 A1* | 12/2018 | Lavoie | B62D 15/0285 |
| 2019/0118801 A1* | 4/2019 | Noh | B60W 30/095 |
| 2019/0258247 A1* | 8/2019 | Bando | B62D 1/00 |
| 2019/0367012 A1* | 12/2019 | Matta | G05D 1/0246 |
| 2020/0082185 A1* | 3/2020 | Yamamoto | B60R 1/27 |
| 2020/0180510 A1* | 6/2020 | Suzuki | G06V 20/586 |
| 2020/0242936 A1* | 7/2020 | Matsunaga | G06V 20/586 |
| 2020/0339195 A1* | 10/2020 | Feijoo | G01S 17/89 |
| 2021/0094536 A1* | 4/2021 | Suzuki | G05D 1/0212 |
| 2021/0107511 A1* | 4/2021 | Matsunaga | B60W 60/001 |
| 2021/0162985 A1* | 6/2021 | Romero Leon | G06V 20/56 |
| 2022/0274586 A1* | 9/2022 | Tokuhiro | B60W 40/09 |
| 2022/0383746 A1* | 12/2022 | Takagi | G08G 1/143 |
| 2023/0029467 A1* | 2/2023 | Gowda | B60R 25/31 |
| 2023/0082770 A1* | 3/2023 | Tokuhiro | B62D 15/028 |
| | | | 340/932.2 |
| 2023/0288932 A1* | 9/2023 | Bettger | G05D 1/0011 |

FOREIGN PATENT DOCUMENTS

| | | |
|---|---|---|
| JP | 2019-144079 A | 8/2019 |
| JP | 2021-054267 A | 4/2021 |

* cited by examiner

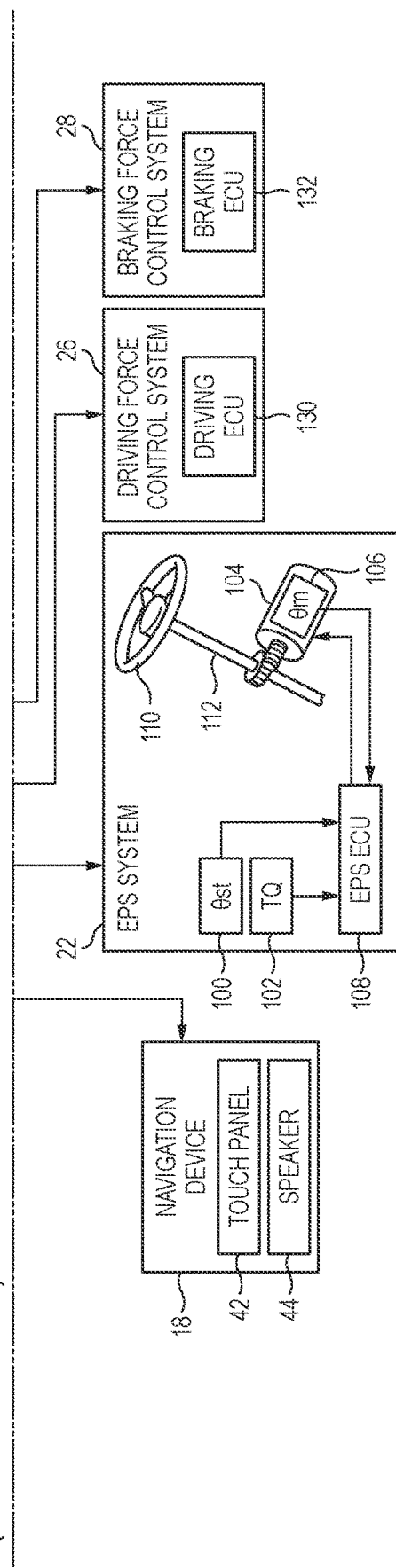

CONTROL DEVICE, CONTROL METHOD, AND STORAGE MEDIUM STORING CONTROL PROGRAM

CROSS REFERENCE TO RELATED APPLICATIONS

This application claims priority to Japanese Patent Application No. 2022-123704 filed on Aug. 3, 2022, the content of which is incorporated herein by reference.

TECHNICAL FIELD

The present invention relates to a control device, a control method, and a storage medium storing a control program.

BACKGROUND ART

In recent years, efforts have been made to provide access to a sustainable transportation system in consideration of people vulnerable among traffic participants. In order to implement the above, focus has been placed on research and development on further improving safety and convenience of traffic by research and development related to automatic driving technique.

In the related art, a device that updates and registers information acquired from surroundings of a vehicle as necessary when the vehicle is automatically moved is known. For example, JP2021-54267A discloses a parking assistance device that acquires surrounding situation information of a surrounding region including a parking target position when a vehicle is repeatedly parked at the same parking target position, stores first situation information indicating the acquired surrounding situation information and a movement path until the vehicle reaches the parking target position, and updates and registers the first situation information based on comparison between the first situation information and second situation information indicating surrounding situation information acquired in a case where the vehicle is newly parked at the parking target position when the parking of the vehicle is completed at the parking target position. Further, JP2019-144079A discloses a travel management device that updates and registers target information when there is a difference between pre-stored target information including position information of a recognition target provided on a travel path in which a vehicle travels and around the travel path and a detection result of the detected recognition target.

Incidentally, in the automatic driving technique, when updating the acquired information, for example, a case where the update registration and control of automatic movement of the vehicle are simultaneously performed may occur. In this case, since processing of a control unit in the vehicle may be in an overload state, smooth processing becomes difficult. Therefore, a method for processing of avoiding such a situation is expected, but in Patent Literatures 1 and 2, a load of the control unit for the processing of updating and registering information and the control for automatically moving the vehicle is not considered. Therefore, there is room for improvement in the related-art technique in this regard.

An object of the present disclosure is to provide a control device, a control method, and a storage medium storing a control program that can prevent an increase in a processing load of a processor when executing registration of parking information of a moving body and control of automatic movement, which contributes to development of the sustainable transportation system accordingly.

SUMMARY OF INVENTION

According to an aspect of the present disclosure, there is provided a control device including an external environment recognition unit configured to acquire recognition data of an external environment of a moving body, a reception unit configured to receive selection of a parking position from a user of the moving body, and a control unit configured to execute automatic parking control for parking the moving body at the parking position based on the recognition data and the parking position and to register the parking position as a designated parking position. The external environment recognition unit acquires first recognition data and second recognition data different from the first recognition data as the recognition data. The control unit executes first registration of registering the designated parking position based on the first recognition data and executes second registration of registering the designated parking position based on the second recognition data. The control unit continues the second registration without executing automatic movement control when execution of the automatic movement control of the moving body is instructed from the user of the moving body during execution of the second registration in new registration of the designated parking position. The control unit suspends the second registration and executes the automatic movement control when execution of the automatic movement control is instructed from the user of the moving body during execution of the second registration in update of the designated parking position.

According to another aspect of the present disclosure, there is provided a control method performed by a control device including an external environment recognition unit configured to acquire recognition data of an external environment of a moving body, a reception unit configured to receive selection of a parking position from a user of the moving body, and a control unit configured to execute automatic parking control for parking the moving body at the parking position based on the recognition data and the parking position and register the parking position as a designated parking position. The control method includes acquiring first recognition data and second recognition data different from the first recognition data as the recognition data, the step being performed by the external environment recognition unit, and executing first registration of registering the designated parking position based on the first recognition data and second registration of registering the designated parking position based on the second recognition data, the step being performed by the control unit, continuing the second registration without executing automatic movement control when execution of the automatic movement control of the moving body is instructed from the user of the moving body during execution of the second registration in new registration of the designated parking position, the step being performed by the control unit, and suspending the second registration and executing the automatic movement control when execution of the automatic movement control is instructed from the user of the moving body during execution of the second registration in update of the designated parking position, the step being performed by the control unit.

According to another aspect of the present disclosure, there is provided a non-transitory computer-readable storage medium storing a control program for a control device including an external environment recognition unit configured to acquire recognition data of an external environment of a moving body, a reception unit configured to receive selection of a parking position from a user of the moving body, and a control unit configured to execute automatic parking control for parking the moving body at the parking position based on the recognition data and the parking position and register the parking position as a designated parking position, in which the external environment recognition unit acquires first recognition data and second recognition data different from the first recognition data as the recognition data. The control program causes the control unit to execute processing of executing first registration of registering the designated parking position based on the first recognition data and second registration of registering the designated parking position based on the second recognition data, continuing the second registration without executing automatic movement control when execution of the automatic movement control of the moving body is instructed from the user of the moving body during execution of the second registration in new registration of the designated parking position, and suspending the second registration and executing the automatic movement control when execution of the automatic movement control is instructed from the user of the moving body during execution of the second registration in update of the designated parking position.

DESCRIPTION OF EMBODIMENTS

Figure 1:
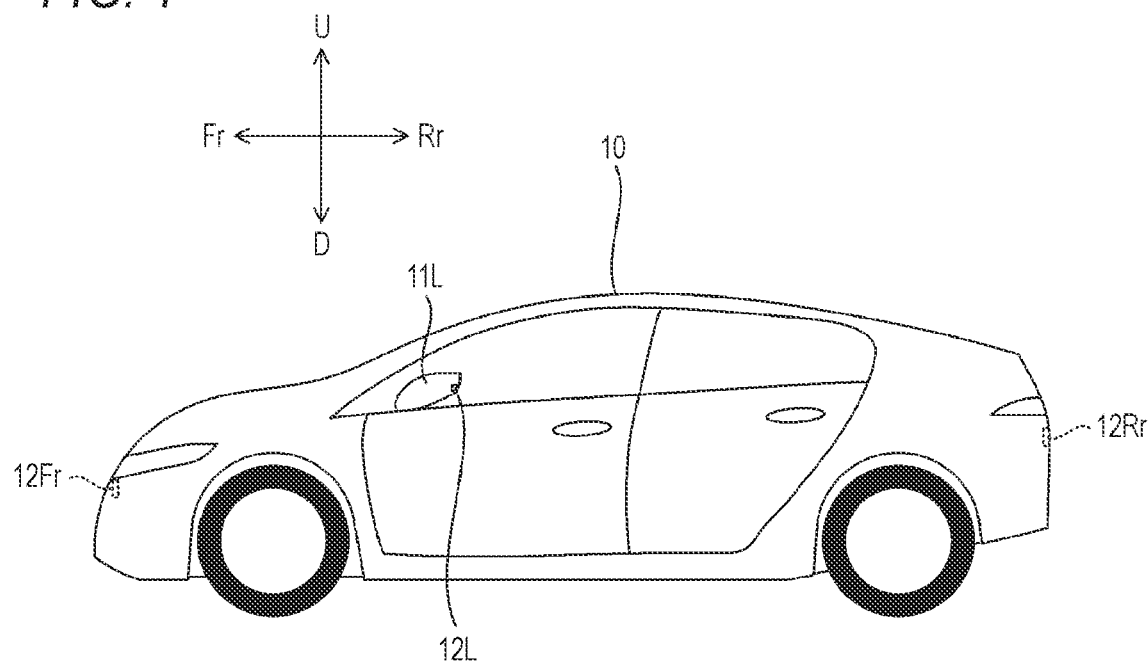
FIG. 1 is a side view showing an example of a vehicle on which a control device according to the present embodiment is mounted.

Hereinafter, an embodiment of a control device, a control method, and a control program of the present invention will be described with reference to the attached drawings. The drawings are viewed in directions of reference numerals. Further, in the present specification and the like, in order to simplify and clarify description, a front-rear direction, a left-right direction, and an upper-lower direction are described according to directions viewed from a user (for example, a driver) of a vehicle 10 shown in FIGS. 1 and 2. In the drawings, a front side of the vehicle 10 is shown as Fr, a rear side is shown as Rr, a left side is shown as a right side is shown as R, an upper side is shown as U, and a lower side is shown as D.

Vehicle 10 on which Control Device of Present Invention is Mounted

Figure 2:
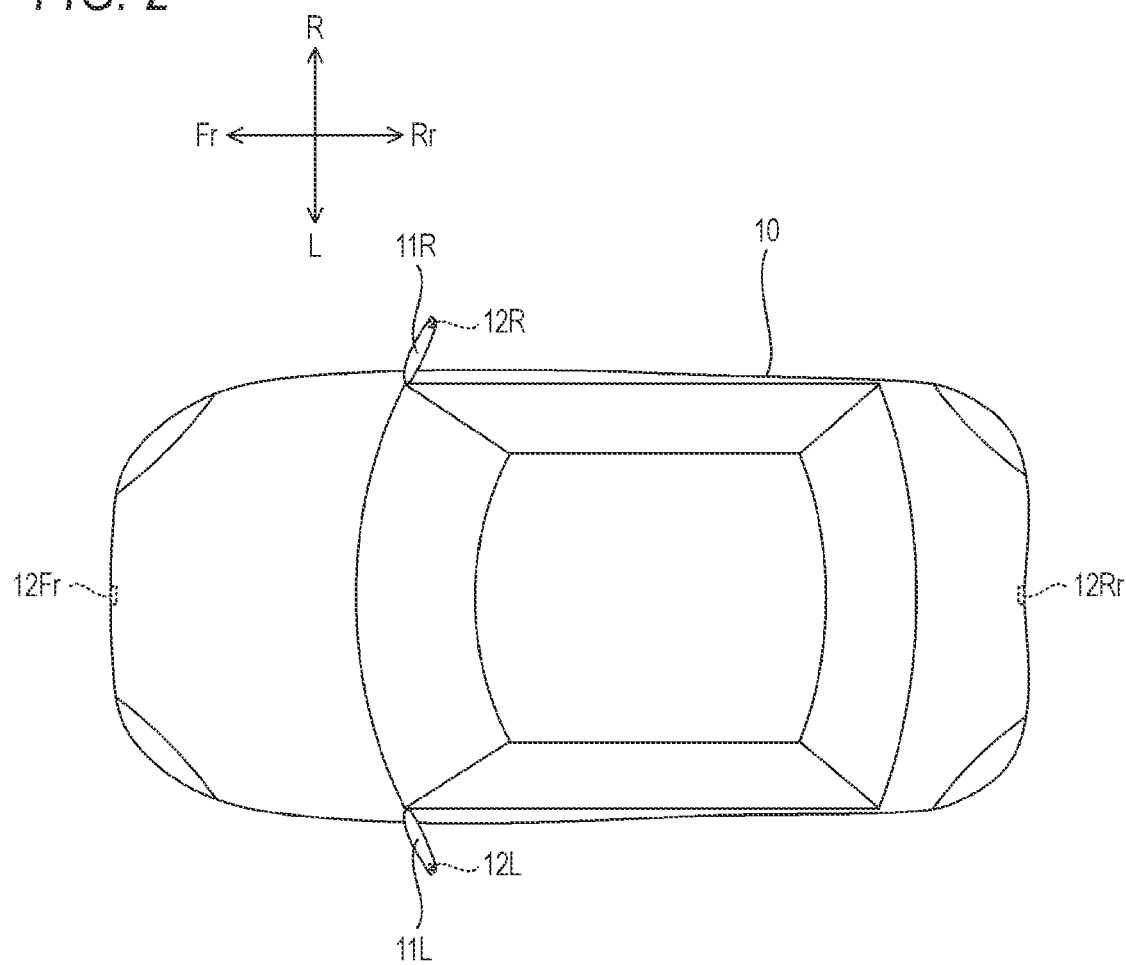
FIG. 2 is a top view of the vehicle shown in FIG. 1.

FIG. 1 is a side view of the vehicle 10 on which the control device of the present invention is mounted. FIG. 2 is a top view of the vehicle 10 shown in FIG. 1. The vehicle 10 is an example of a moving body of the present invention.

The vehicle 10 is an automobile including a drive source (not shown), and wheels including driven wheels driven by power of the drive source and steerable steering wheels. In the present embodiment, the vehicle 10 is a four-wheel automobile including a pair of left and right front wheels and rear wheels. The drive source of the vehicle 10 is, for example, an electric motor. The drive source of the vehicle 10 may be an internal combustion engine such as a gasoline engine or a diesel engine, or a combination of the electric motor and the internal combustion engine. Further, the drive source of the vehicle 10 may drive the pair of left and right front wheels, the pair of left and right rear wheels, or the four wheels including the pair of left and right front wheels and rear wheels. Both the front wheels and the rear wheels may be the steerable steering wheels, or either one of the front wheels and the rear wheels may be the steerable steering wheels.

The vehicle 10 further includes side mirrors 11L and 11R. The side mirrors 11L and 11R are mirrors (rear-view mirrors) that are provided on outer sides of front seat doors of the vehicle 10 and that are for the user to check a rear side and rear left and right sides. Each of the side mirrors 11L and 11R, is fixed to a main body of the vehicle 10 by a rotation shaft that extends in a perpendicular direction, and can be opened and closed by being rotated around the rotation shaft.

The vehicle 10 further includes a front camera 12Fr, a rear camera 12Rr, a left side camera 12L, and a right side camera 12R. The front camera 12Fr is a digital camera that is provided on a front side of the vehicle 10 and that images the front side of the vehicle 10. The rear camera 12Rr is a digital camera that is provided on a rear side of the vehicle 10 and that images the rear side of the vehicle 10. The left side camera 12L is a digital camera that is provided on the left side mirror 11L of the vehicle 10 and that images a left side of the vehicle 10. The right side camera 12R is a digital camera that is provided on the right side mirror 11R of the vehicle 10 and that images a right side of the vehicle 10. The left side camera 12L and the right side camera 12R are examples of a side camera of the present invention. The front camera 12Fr is an example of a front camera of the present invention, and the rear camera 12Rr is an example of a rear camera of the present invention.

Internal Configuration of Vehicle 10

Figure 3:
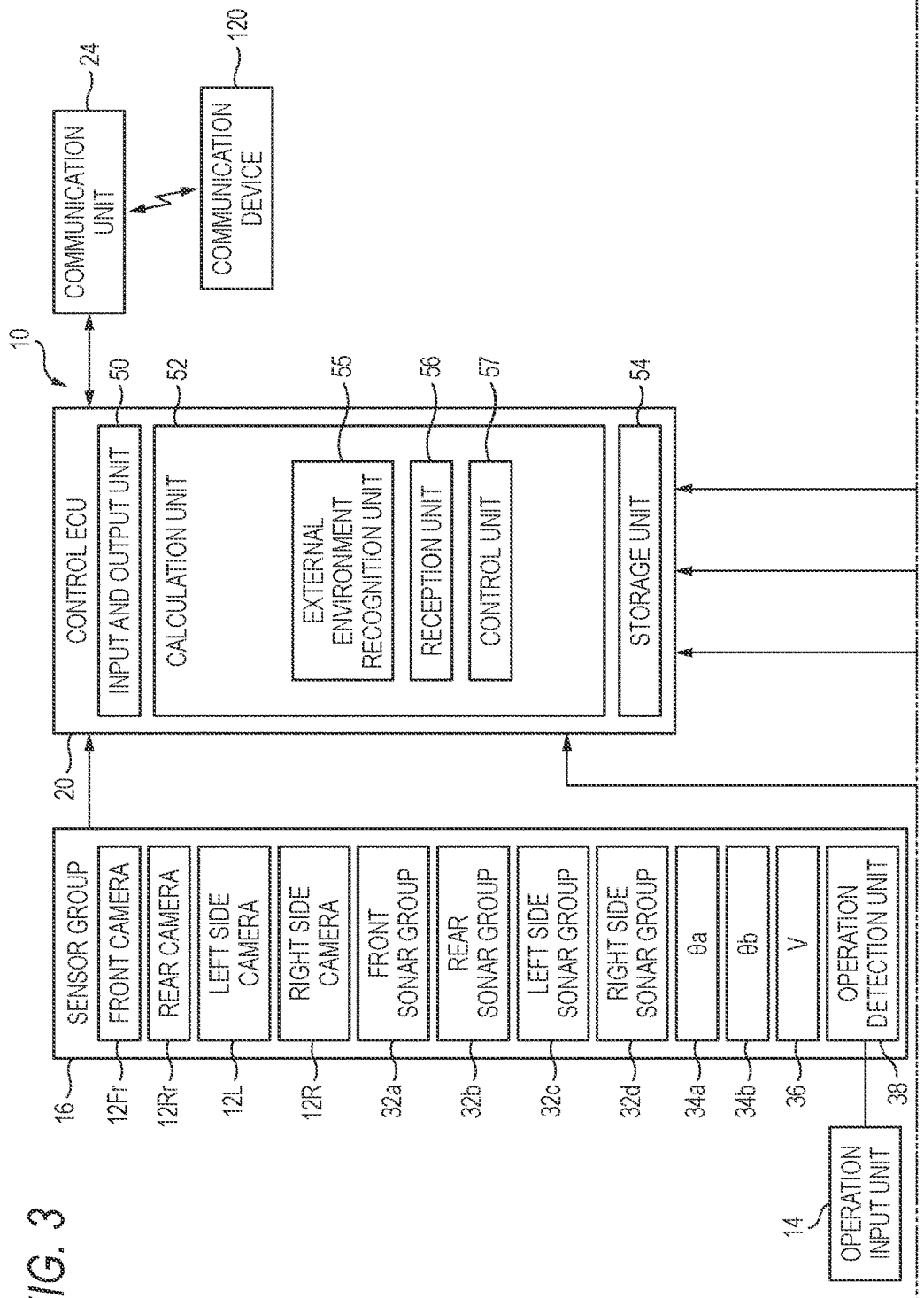
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28. A calculation unit 52 is an example of a control device of the present invention.

The sensor group 16 acquires various detection values used for control performed by the control ECU 20. The sensor group 16 includes the front camera 12Fr, the rear camera 12Rr, the left side camera 12R and the right side camera 12R. Further, the sensor group 16 includes a front sonar group 32a, a rear sonar group 32b, a left side sonar group 32c, and a right side sonar group 32d. Further, the sensor group 16 includes wheel sensors 34a and 34b, a vehicle speed sensor 36, and an operation detection unit 38.

The front camera 12Fr, the rear camera 12Rr, the left side camera 12L and the right side camera 12R acquire recognition data (for example, a surrounding image) for recognizing external environment of the vehicle 10 by imaging surroundings of the vehicle 10. The recognition data acquired by the left side camera 12L and the right side camera 12R is an example of first recognition data of the present invention. The recognition data acquired by the front camera 12Fr and the rear camera 12Rr is an example of second recognition data of the present invention. Surrounding images captured by the front camera 12Fr, the rear camera 12Rr, the left side camera 12L, and the right side camera 12R are referred to as a front image, a rear image, a left side image, and a right side image, respectively. An image constituted by the left side image and the right side image may be referred to as a side image. A surrounding image generated by combining imaging data of the front camera 12Fr, the rear camera 12Rr, the left side camera 12L, and the right side camera 12R may be referred to as a top view image of the vehicle 10.

The front sonar group 32a, the rear sonar group 32b, the left side sonar group 32c, and the right side sonar group 32d emit sound waves to the surroundings of the vehicle 10, and receive reflected sounds from other objects. The front sonar group 32a includes, for example, four sonars. The sonars that constitute the front sonar group 32a are respectively provided on an obliquely left front side, a front left side, a front right side, and an obliquely right front side of the vehicle 10. The rear sonar group 32b includes, for example, four sonars. The sonars that constitute the rear sonar group 32b are respectively provided on an obliquely left rear side, a rear left side, a rear right side, and an obliquely right rear side of the vehicle 10. The left side sonar group 32c includes, for example, two sonars. The sonars that constitute the left side sonar group 32c are respectively provided at a left side front portion and a left side rear portion of the vehicle 10. The right side sonar group 32d includes, for example, two sonars. The sonars that constitute the right side sonar group 32d are respectively provided at a right side front portion and a right side rear portion of the vehicle 10.

The wheel sensors 34a and 34b detect rotation angles of the wheels of the vehicle 10. The wheel sensors 34a and 34b may be implemented by angle sensors, or may be implemented by displacement sensors. The wheel sensors 34a and 34b output detection pulses each time the wheels are rotated at a predetermined angle. The detection pulses output from the wheel sensors 34a and 34b are used for calculating the rotation angles of the wheels and rotation speeds of the wheels. A movement distance of the vehicle 10 is calculated based on the rotation angles of the wheels. The wheel sensor 34a detects, for example, a rotation angle θa of the left rear wheel. The wheel sensor 34b detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a counter shaft of a transmission.

The operation detection unit 38 detects operation content of a user performed using the operation input unit 14, and outputs the detected operation content to the control ECU 20. The operation input unit 14 includes various user interfaces such as a side mirror switch for switching between open and closed states of the side mirrors 11L and 11R, and a shift lever (selector lever or selector).

The navigation device 18 detects a current position of the vehicle 10 by using, for example, a global positioning system (GPS), and guides the user to a path to a destination. The navigation device 18 includes a storage device (not shown) provided with a map information database.

The navigation device 18 includes a touch panel 42 and a speaker 44. The touch panel 42 functions as an input device and a display device of the control ECU 20. The speaker 44 outputs various kinds of guidance information to a passenger of the vehicle 10 by a sound.

The touch panel 42 is configured to input various commands to the control ECU 20. For example, the user can input a command related to movement assistance of the vehicle 10 via the touch panel 42. The movement assistance includes parking assistance and parking-lot-leaving assistance of the vehicle 10. Further, the touch panel 42 is configured to display various screens related to control content of the control ECU 20. For example, a screen related to the movement assistance of the vehicle 10 is displayed on the touch panel 42. Specifically, a parking assistance button for requesting the parking assistance and a parking-lot-leaving assistance button for requesting the parking-lot-leaving assistance of the vehicle are displayed on the touch panel 42. The parking assistance button includes an automatic parking button for requesting parking by automatic steering of the control ECU 20, and an assisted parking button for requesting assistance during parking by an operation of the user. The parking-lot-leaving assistance button includes an automatic parking-lot-leaving button for requesting parking-lot-leaving by the automatic steering of the control ECU 20, and an assisted parking-lot-leaving button for requesting assistance during parking-lot-leaving by an operation of the user. A constituent element other than the touch panel 42, for example, a smartphone or a tablet terminal may be used as an input device or a display device.

The "parking" is, for example, a stop as an occupant gets on or off the vehicle, and excludes a temporary stop due to a traffic signal or the like. Further, a "parking position" is a position where the moving body is stopped.

The control ECU 20 includes an input and output unit 50, a calculation unit 52, and a storage unit 54. The calculation unit 52 is implemented by, for example, a central processing unit (CPU). The calculation unit 52 performs various kinds of control by controlling the units based on a program stored in the storage unit 54. Further, the calculation unit 52 inputs and outputs a signal from and to each unit connected to the control ECU 20 via the input and output unit 50.

The calculation unit 52 includes an external environment recognition unit 55 that recognizes an external environment recognition image, a reception unit 56 that receives an instruction from the user, and a control unit 57 that controls automatic movement of the vehicle 10.

The external environment recognition unit 55 acquires surrounding images (recognition data) of the vehicle 10 captured by the front camera 12Fr, the rear camera 12Rr, the left side camera 12L, and the right side camera 12R from the cameras.

The reception unit 56 receives an instruction signal for instructing an operation of the vehicle 10 input from the user via the touch panel 42 of the navigation device 18 or the smartphone. For example, when a predetermined parking candidate position is designated by selection of the user from parking candidate positions displayed on the touch panel 42, the reception unit 56 receives a signal output from the touch panel 42 by the designation as an instruction signal for parking the vehicle 10.

The control unit 57 performs the automatic parking assistance and the automatic parking-lot-leaving assistance of the vehicle 10 by the automatic steering for automatically operating the steering 110 under control of the control unit 57. In assisting the automatic steering, an accelerator pedal (not shown), a brake pedal (not shown), and the operation input unit 14 are automatically operated. Further, the control unit 57 performs assisted parking assistance and assisted parking-lot-leaving assistance when the vehicle 10 is manually parked and manually caused to leave a parking lot by operating the accelerator pedal, the brake pedal, and the operation input unit 14 by the user.

For example, the control unit 57 controls automatic parking of parking the vehicle 10 at a designated predetermined parking position and controls automatic parking-lot-leaving of causing the vehicle 10 to leave the predetermined parking position based on the recognition data of the external environment of the vehicle 10 acquired by the front camera 12Fr, the rear camera 12Rr, the left side camera 12L, and the right side camera 12R and the predetermined parking position designated by the user.

The control unit 57 registers the predetermined parking position designated by the user as a designated parking position in the storage unit 54. The control unit 57 registers features related to the designated parking position as registered features in the storage unit 54 based on the recognition data of the external environment of the vehicle 10 acquired by the front camera 12Fr, the rear camera 12Rr, the left side camera 12L, and the right side camera 12R. The control unit 57 controls the automatic parking of parking the vehicle 10 at the designated parking position based on the recognition data of the external environment of the vehicle 10 and the registered features related to the designated parking position designated by the user.

The features related to the designated parking position include features of the designated parking position itself, features around the designated parking position, and the like. Examples of the features of the designated parking position itself include features in which characters such as "parking" are displayed in the designated parking position. Examples of the features around the designated parking position include featured buildings, obstacles, and the like present around the designated parking position.

The control unit 57 detects a matching rate between current features obtained based on the recognition data of the external environment during execution of the automatic parking and the registered features acquired and already registered before the execution, and updates the registered features according to the matching rate. The registered features already registered are examples of registration information of the present invention.

When the matching rate between the features during the execution of the automatic parking and the registered features is equal to or larger than a first threshold (for example, 80%), the control unit 57 does not update the registered features. When the matching rate between the features during the execution of the automatic parking and the registered features is less than the first threshold and is equal to or larger than a second threshold (for example, 60%) smaller than the first threshold, the control unit 57 updates the registered features. When the matching rate between the features during the execution of the automatic parking and the registered features is less than the second threshold and is equal to or larger than a third threshold (for example, 30%) smaller than the second threshold, the control unit 57 does not update the registered features. When the matching rate between the features during the execution of the automatic parking and the registered features is less than the third threshold, the control unit 57 newly registers features. Although the features are already newly registered, when the matching rate of the features is, for example, equal to or larger than 60% and less than 80%, the control unit 57 updates the registered features.

When the matching rate between the features during the execution of the automatic parking and the registered features is equal to or larger than the second threshold, the control unit 57 executes the automatic parking of the vehicle 10 based on the registered features. When the matching rate between the features during the execution of the automatic parking and the registered features is less than the second threshold, the control unit 57 does not execute the automatic parking of the vehicle 10 based on the registered features. Each numerical value (%) indicating the threshold of the matching rate is merely an example of a numerical value as a standard.

The control unit 57 performs first registration of registering the designated parking position based on the first recognition data acquired by the left side camera 12L and the right side camera 12R. Further, the control unit 57 performs second registration of registering the designated parking position based on the second recognition data acquired by the front camera 12Fr and the rear camera 12Rr. The second recognition data acquired by the front camera 12Fr and the rear camera 12Rr is detailed recognition data obtained by imaging a range narrower than the first recognition data (surrounding image) acquired by the left side camera 12L and the right side camera 12R. The first registration is to register the features related to the designated parking position based on the first recognition data. The second registration is registration for adding and correcting the registered features related to the designated parking position registered based on the first recognition data by using the features related to the designated parking position based on the detailed second recognition data.

When execution of automatic movement control of the vehicle 10 is instructed from the user while executing the second registration in new registration of the features related to the designated parking position, the control unit 57 continues the second registration without executing the automatic movement control of the vehicle 10. The automatic movement control in this case is, for example, automatic parking-lot-leaving control. However, the automatic movement control in this case is not limited to the automatic parking-lot-leaving control, and may be, for example, automatic parking control after the parking-lot-leaving of the vehicle 10 is performed by manual driving by the user after the automatic parking described above. When the execution of the automatic movement control of the vehicle 10 is instructed from the user while executing the second registration in updating the features related to the designated parking position, the control unit 57 suspends the second registration and executes the automatic movement control of the vehicle 10.

The control unit 57 executes the first registration of registering the features related to the designated parking position based on the first recognition data in parallel with the automatic parking control of the vehicle 10. The control unit 57 executes the second registration of adding and correcting the registered features related to the designated parking position based on the second recognition data after the automatic parking control and the first registration are ended.

When the second registration is continued without executing the automatic movement control of the vehicle 10 during the new registration of the features, the control unit 57 notifies the user of the vehicle 10 that the automatic movement control is not executed due to the second registration being continued. When the second registration is continued without executing the automatic movement control of the vehicle 10 during the new registration of the features, the control unit 57 notifies the user of the vehicle 10 of time required until the second registration is completed. The time required until the second registration is completed means time during which the automatic movement control is not executed even if the execution of the automatic movement control is instructed. The time is predicted time. When there is a variation, predicted maximum time is notified. The control unit 57 performs control of restricting the instruction operation of executing the automatic movement control in a period during which the second registration in the new registration of the features related to the designated parking position is executed. For example, the control unit 57 disables or hides a button for instructing start of the automatic movement (for example, an automatic parking-lot-leaving button).

When execution of the automatic movement control of the vehicle 10 (for example, the automatic parking-lot-leaving control) is instructed from the user during execution of the second registration in updating the features related to the designated parking position, the control unit 57 notifies the user of at least one of suspending the second registration and executing the automatic movement control of the vehicle 10. In a period during which the second registration in updating the features related to the designated parking position is executed, the control unit 57 notifies the user that the automatic movement control of the vehicle 10 can be executed.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby enabling the occupant to perform operation assistance of the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 can perform wireless communication with another communication device 120. The other communication device 120 is a base station, a communication device of another vehicle, an information terminal such as a smartphone carried by the passenger of the vehicle 10, or the like.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a braking mechanism or the like (not shown) based on an operation performed by the user on the brake pedal (not shown).

Automatic Parking Control Performed by Calculation Unit 52

Next, the automatic parking control of the vehicle 10 performed by the calculation unit 52 will be described with reference to FIGS. 4 to 9.

Figure 4:
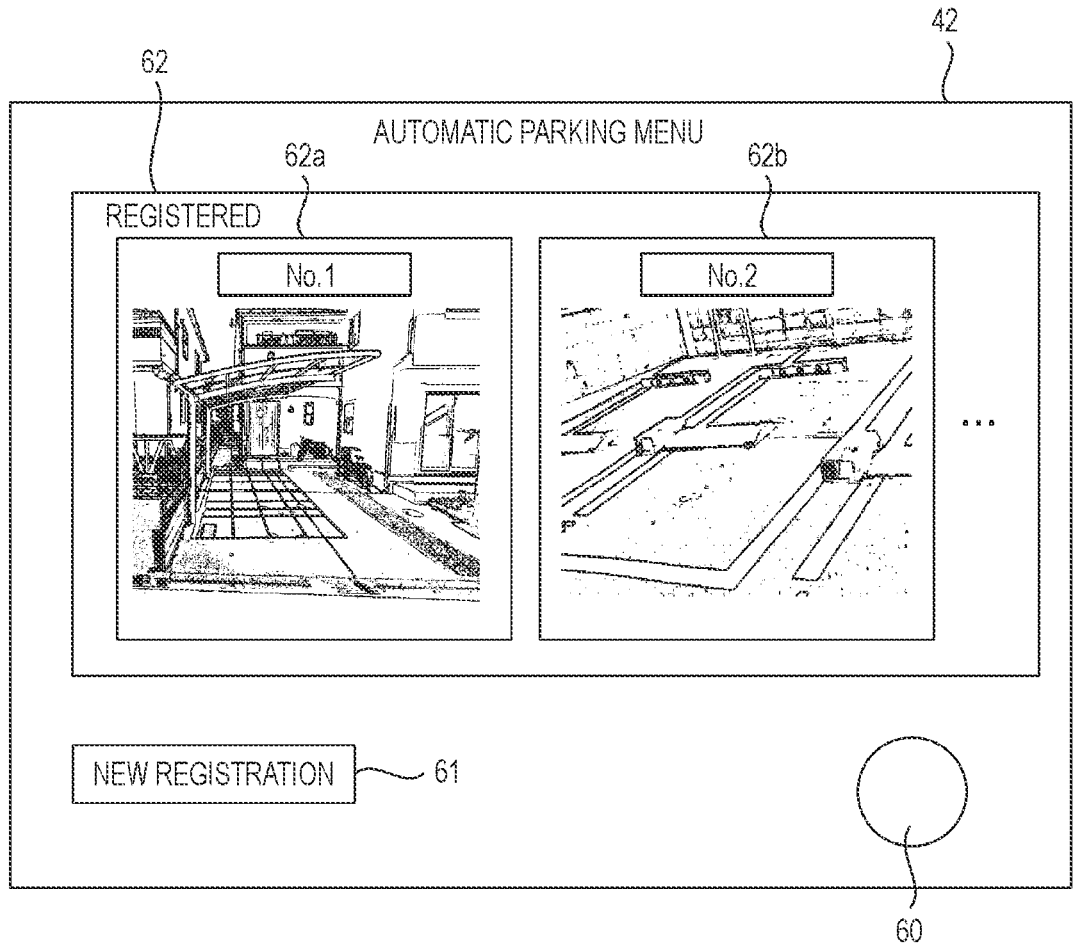
FIG. 4 is a diagram showing an example of an image displayed on a navigation device when automatically parking the vehicle.

FIG. 4 is a diagram showing an example of an "automatic parking menu" displayed on the touch panel 42 of the navigation device 18 when automatically parking the vehicle 10. An image of the automatic parking menu is displayed by touching an automatic parking button 60 displayed on the touch panel 42. The automatic parking button 60 is touched to display the automatic parking menu when, for example, the driver who wants to park the vehicle 10 comes to a vicinity of a parking lot.

As shown in FIG. 4, a new registration button 61 and a registered parking position image button 62 are displayed in the image of the automatic parking menu. The new registration button 61 is a button operated when the vehicle 10 is to be parked at a parking position newly registered as the designated parking position. The registered parking position image button 62 is a button operated when the vehicle 10 is to be parked at the already registered designated parking position. Examples of the registered parking position image button 62 include a parking position image button on which a parking lot at home is registered as the designated parking position as shown in a No. 1 image button 62a, and a parking position image button on which a coin parking having a high parking frequency is registered as the designated parking position as shown in a No. 2 image button 62b. The image displayed on the registered parking position image button 62 is an image captured by, for example, the front camera 12Fr of the vehicle 10 during registration.

Automatic Parking Control to New Parking Position

First, the automatic parking control performed by the calculation unit 52 when the new registration button 61 is touched will be described with reference to FIGS. 5 to 8.

Figure 5:
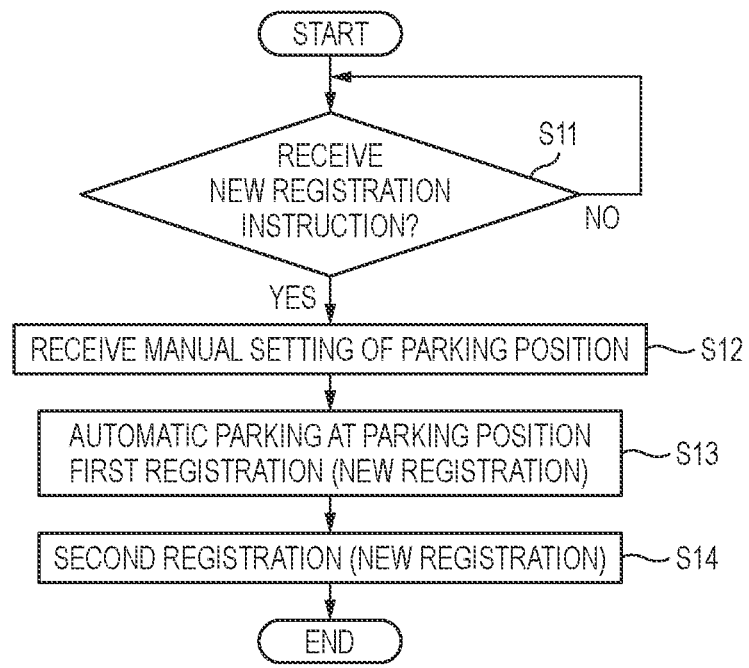
FIG. 5 is a flowchart showing automatic parking control for parking the vehicle at a new parking position.
Figure 6:
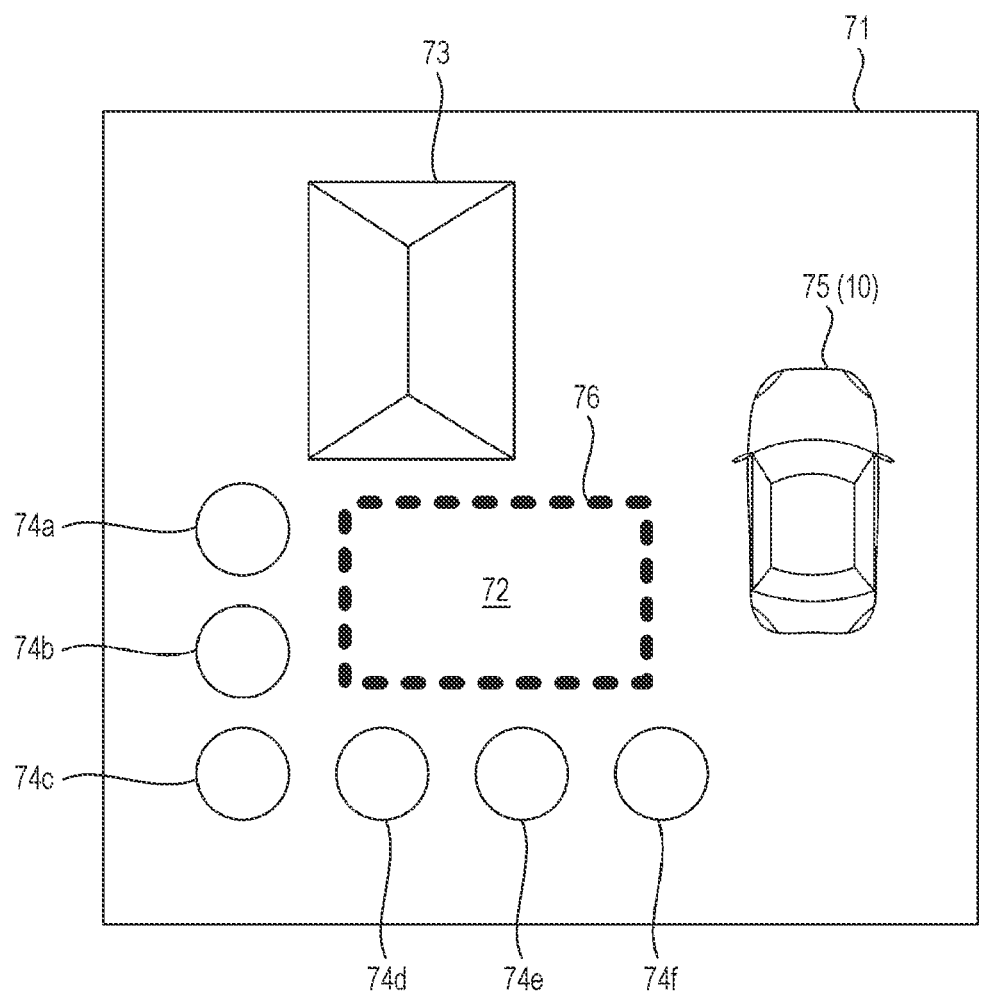
FIG. 6 is a diagram in which a parking position is set in a top view image generated by recognition data of an external environment of the vehicle.
Figure 7:
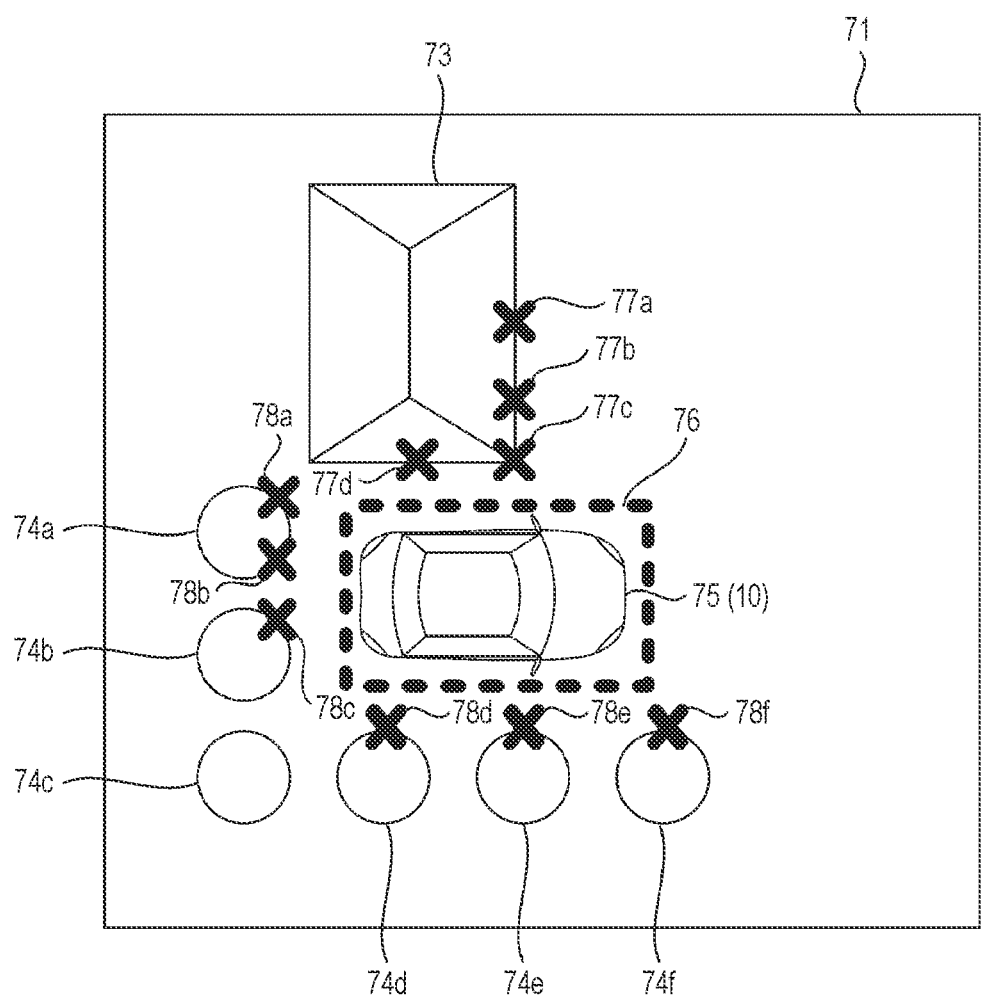
FIG. 7 is a diagram showing features of surroundings with respect to the parking position shown in FIG. 6.
Figure 8:
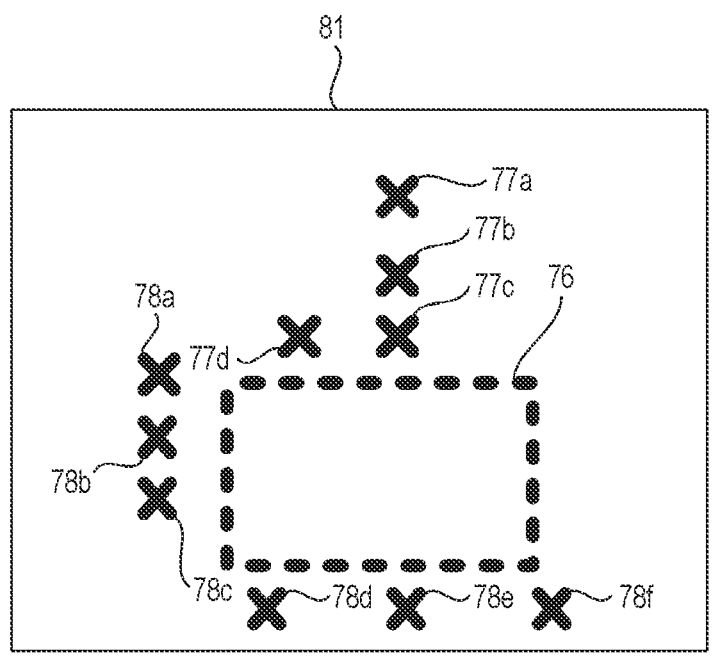
FIG. 8 is a diagram showing an example of a feature map registered for the parking position.

FIG. 5 is a flowchart showing the automatic parking control for parking the vehicle at a new parking position. FIG. 6 is a diagram in which a parking position 76 is set in a top view image 71 (combined image) generated by the recognition data of the external environment of the vehicle 10 acquired by the front camera 12Fr, the rear camera 12Rr, the left side camera 12L, and the right side camera 12R. FIG. 7 is a diagram showing features of surroundings with respect to the parking position 76 shown in FIG. 6. FIG. 8 is a diagram showing an example of a feature map registered for the parking position 76. The calculation unit 52 starts processing shown in FIG. 5 when the new registration button 61 is touched.

The calculation unit 52 determines whether a new registration instruction is received, that is, whether the new registration button 61 is touched by the reception unit 56 (step S11).

When the new registration button 61 is not touched (step S11: No) in step S11, the calculation unit 52 repeats the processing in step S11.

When the new registration button 61 is touched in step S11 (step S11: Yes), the calculation unit 52 receives manual setting performed by the driver for setting a parking position for the vehicle 10 by the reception unit 56 (step S12).

For example, the driver of the vehicle 10 stops the vehicle 10 in front of the parking lot at home, and touches the new registration button 61 to register the parking lot as a new designated parking position. Then, as shown in FIG. 6, the top view image 71 generated based on the recognition data of the external environment of the vehicle 10 is displayed on the touch panel 42 of the vehicle 10. In the top view image 71, the vehicle 10 stopped in front of a parking lot 72 at home is displayed. Further, in the top view image 71, a residence of the driver (building) 73 and a plurality of plantings (obstacles) 74a to 74f are displayed. The parking lot 72 is provided between the building 73 and the obstacles 74a to 74f. The vehicle displayed in the top view image 71 is an image showing a state where the vehicle 10 is viewed from above, and is a vehicle image 75 generated (captured) in advance and stored in the storage unit 54 or the like. The manual setting of the parking position can be performed by touching the parking position 76 having a rectangular shape and showing a region where the vehicle 10 is parked on the touch panel 42 where the top view image 71 is displayed, and slidably moving the vehicle 10 to a target parking position where the vehicle 10 is desired to be parked.

When the manual setting of the parking position 76 is received in step S12, the calculation unit 52 recognizes an object in a movement path to the parking position 76 based on the recognition data of the external environment of the vehicle 10 acquired by the front camera 12Fr, the rear camera 12Rr, the left side camera 12L, and the right side camera 12R by the control unit 57. Based on a recognition result of the movement path, the calculation unit 52 moves the vehicle 10 toward a predetermined direction by a predetermined distance and automatically parks the vehicle 10 at the parking position 76 by the control unit 57 (step S13). Further, in parallel with the automatic parking of the vehicle 10, the calculation unit 52 performs the first registration of detecting features related to the parking position 76 from the first recognition data of the external environment acquired by the left side camera 12L and the right side camera 12R during the automatic parking and newly registering the detected features in the storage unit 54 by the control unit 57 (step S13). Further, the calculation unit 52 acquires, by the external environment recognition unit 55, the second recognition data of the external environment imaged by the rear camera 12Rr during the automatic parking of the vehicle 10. In FIGS. 6 and 7, when the vehicle 10 is back-in parked at the parking position 76, the rear camera 12Rr acquires the second recognition data.

For example, as in the top view image 71 shown in FIG. 7, the calculation unit 52 detects, by the control unit 57, building features 77a to 77d showing a position of a contour of the building 73 on a side close to the parking position 76, obstacle features 78a to 78f showing positions of the obstacles 74a to 73f present around the parking position 76, and the like as the features related to the designated parking position 76.

Next, the calculation unit 52 performs the second registration of detecting the features related to the parking position 76 from the second recognition data acquired by the rear camera 12Rr during the automatic parking, and newly additionally registering and correcting and registering registered features related to the parking position 76 registered based on the first recognition data in step S13 based on the detected features by the control unit 57 (step S14). In this case, all the registered features of the parking position 76 may be updated, and only different features in the registered features may be updated.

The parking position 76 and the features thereof are registered as, for example, a feature map 81 shown in FIG. 8. The feature map 81 is registered as, for example, a map showing a relationship between the building features 77a to 77d and the obstacle features 78a to 78f detected in the top view image 71 in FIG. 7 and the manually set parking position 76.

Accordingly, the parking position 76 designated by the driver is registered in the storage unit 54 as the designated parking position including the registered features (feature map), and is displayed on the automatic parking menu (see FIG. 4) as one of the registered parking position image buttons 62.

Automatic Parking Control to Registered Parking Position

Figure 9:
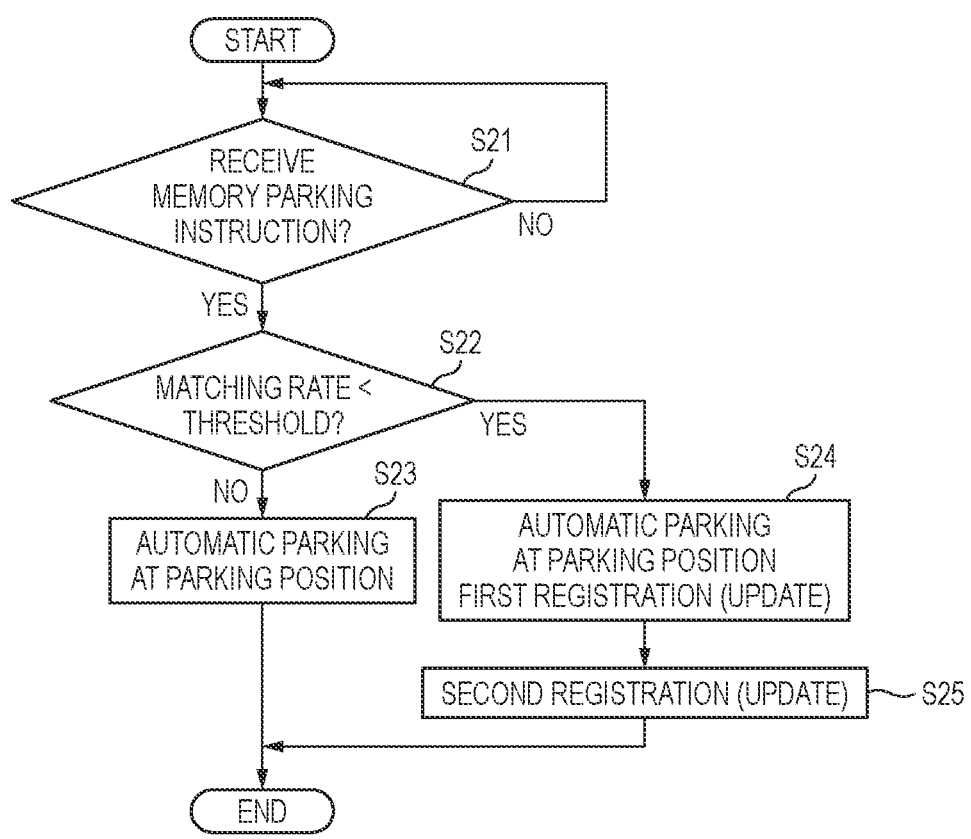
FIG. 9 is a flowchart showing an example of automatic parking control for parking the vehicle at a registered parking position.

Next, automatic parking control performed by the calculation unit 52 when the registered parking position image button 62 is touched will be described with reference to FIG. 9. FIG. 9 is a flowchart showing an example of the automatic parking control for parking the vehicle 10 at a registered parking position.

When the registered parking position image button 62 of the automatic parking menu shown in FIG. 4 is touched, the calculation unit 52 starts processing in FIG. 9. In the present example, it is assumed that the No. 1 image button 62a is touched by the driver of the vehicle 10.

The calculation unit 52 determines, by the reception unit 56, whether a memory parking instruction is received, that is, whether the registered parking position image button 62 is touched (step S21).

When the registered parking position image button 62 is not touched in step S21 (step S21: No), the calculation unit 52 repeats the processing in step S21.

When the registered parking position image button 62 is touched in step S21 (step S21: Yes), the calculation unit 52 detects current features related to the designated parking position (hereinafter, referred to as features during execution) based on the recognition data acquired by the front camera 12Fr, the rear camera 12Rr, the left side camera 12L, and the right side camera 12R by the control unit 57, and calculates a matching rate between the detected features during execution and the registered features registered for the parking position 76 of the touched No. 1 image button 62a. The calculation unit 52 determines, by the control unit 57, whether the matching rate between the features during execution and the registered features is smaller than a predetermined threshold (for example, 80%) (step S22). Further, the calculation unit 52 recognizes an object in the movement path to the parking position 76 based on the recognition data of the external environment of the vehicle 10 acquired by the front camera 12Fr, the rear camera 12Rr, the left side camera 12L, and the right side camera 12R by the control unit 57.

When the matching rate is not smaller than the predetermined threshold, that is, the matching rate is equal to or larger than 80% in step S22 (step S22: No), the calculation unit 52 moves the vehicle 10 toward a predetermined direction by a predetermined distance and automatically parks the vehicle 10 at the parking position 76 based on a recognition result of the movement path by the control unit 57 (step S23). Since the matching rate between the features during execution and the registered features is equal to or larger than 80%, it is determined that there is almost no change in the features of the external environment at the designated parking position, the feature map representing the registered features registered so far in the storage unit 54 is maintained as it is, and the feature map is not updated.

When the matching rate is smaller than the predetermined threshold, that is, the matching rate is less than 80% in step S22 (step S22: Yes), the calculation unit 52 moves the vehicle 10 toward a predetermined direction by a predetermined distance and automatically parks the vehicle 10 at the parking position 76, and performs the first registration of updating the features of the parking position 76 in parallel with the control of the automatic parking based on a recognition result of the movement path by the control unit 57 (step S24). Specifically, the calculation unit 52 performs the first registration of detecting the features during execution related to the parking position 76 from the first recognition data of the external environment acquired by the left side camera 12L and the right side camera 12R during the automatic parking, and updating the registered features registered so far for the parking position 76 to the features during execution by the control unit 57. Further, the calculation unit 52 acquires, by the external environment recognition unit 55, the second recognition data of the external environment imaged by the rear camera 12Rr during the automatic parking of the vehicle 10. As shown in FIGS. 6 and 7, when the vehicle 10 is back-in parked at the parking position 76, the rear camera 12Rr acquires the second recognition data.

Next, the calculation unit 52 performs the second registration of detecting the features during execution related to the parking position 76 from the second recognition data acquired by the rear camera 12Rr during the automatic parking, and additionally updating and correcting and updating the registered features related to the parking position 76 updated based on the first recognition data in step S24 based on the detected features during execution by the control unit 57 (step S25). In this case, the entire feature map 81 may be updated, and only different features in the feature map 81 may be updated.

In FIG. 9, the example in which the registered features are updated when the matching rate between the features during execution and the registered features is smaller than the predetermined threshold (for example, 80%) has been described, but the present invention is not limited thereto. For example, when the matching rate between the features during execution and the registered features is equal to or larger than 60% and less than 80%, the registered features may be updated, when the matching rate is equal to or larger than 30% and less than 60%, the driver may be allowed to determine whether to perform update, and when the matching rate is less than 30%, the features may be newly registered. The threshold (%) of the matching rate exemplified in the present automatic parking control is an example, and can be changed as appropriate.

Automatic Movement Control Performed by Calculation Unit 52

Figure 10:
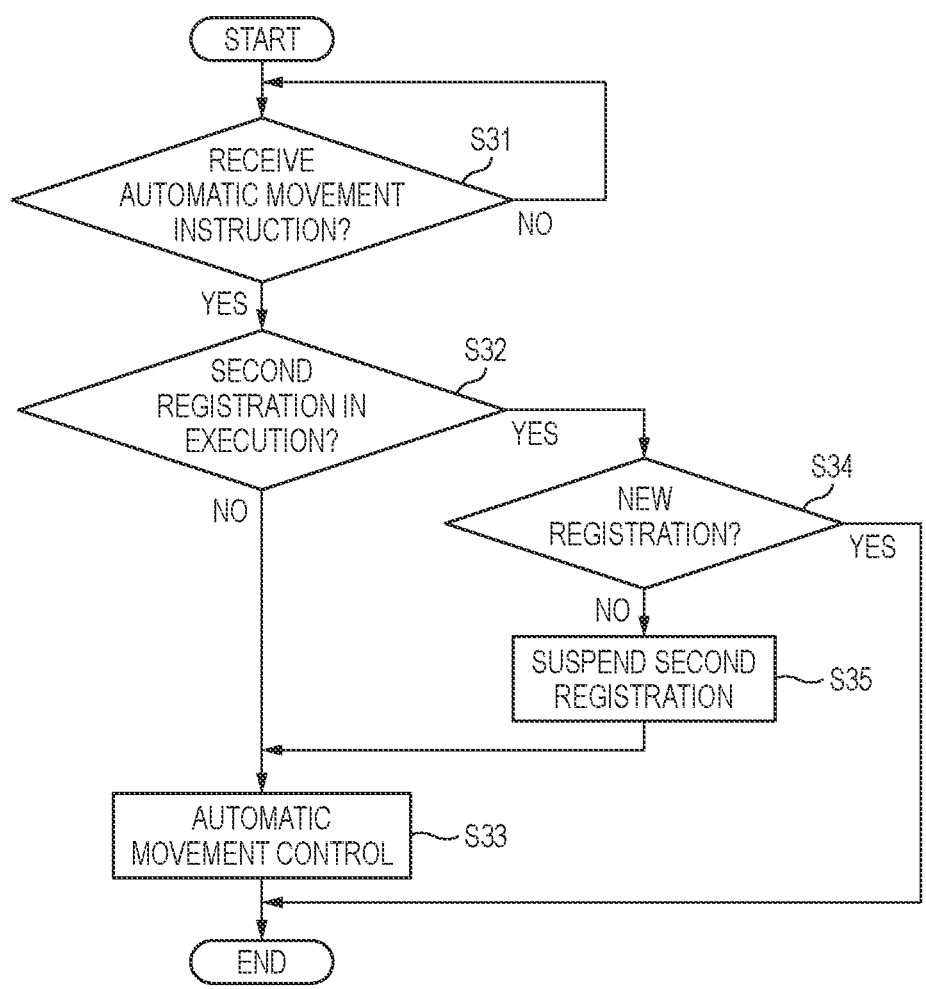
FIG. 10 is a flowchart showing an example of automatic movement control for moving the vehicle from a predetermined parking position.

Next, the automatic movement control of the vehicle 10 performed by the calculation unit 52 will be described with reference to FIG. 10. FIG. 10 is a flowchart showing an example of the automatic movement control for moving the vehicle 10 from a predetermined parking position. The automatic movement control in this case is, for example, the automatic parking-lot-leaving control, may be the automatic parking control after the parking-lot-leaving of the vehicle 10 is performed by manual driving by the user after the automatic parking, or the like as described above.

For example, when the automatic parking button 60 shown in FIG. 4 or an automatic parking-lot-leaving button (not shown) displayed on the touch panel 42 is touched, the calculation unit 52 starts processing in FIG. 10. As a specific situation, a case where the driver who parks the vehicle 10 in the parking lot 72 at home as described above in FIGS. 5 and 9 causes the vehicle 10 to automatically leave the parking lot 72, a case where the driver causes the vehicle 10 to manually leave the parking lot 72 after the vehicle 10 is parked in the parking lot 72 and further causes the vehicle 10 to automatically park in the parking lot 72, and the like are assumed.

The calculation unit 52 determines, by the reception unit 56, whether an automatic movement instruction (for example, the automatic parking-lot-leaving control) is received, for example, whether the automatic parking-lot-leaving button is touched (step S31).

When the automatic movement instruction is not received in step S31 (step S31: No), the calculation unit 52 repeats the processing in step S31.

When the automatic movement instruction is received in step S31 (step S31: Yes), the calculation unit 52 determines, by the control unit 57, whether the second registration is currently in execution (step S32). As described above, the second registration is registration of adding and correcting the registered features of the designated parking position based on the first recognition data imaged by the left side camera 12L and the right side camera 12R, based on the features of the designated parking position based on the detailed second recognition data imaged by the front camera 12Fr and the rear camera 12Rr. The second registration includes the second registration performed during the new registration described in step S14 in FIG. 5 and the second registration performed during the update registration described in step S25 in FIG. 9.

When the second registration is not in execution currently in step S32 (step S32: No), the calculation unit 52 recognizes an object in a path in which the vehicle 10 automatically moves (for example, a movement path in which the vehicle 10 leaves the parking position 76) based on the recognition data of the external environment of the vehicle acquired by the front camera 12Fr, the rear camera 12Rr, the left side camera 12L, and the right side camera 12R by the control unit 57. The calculation unit 52 performs the automatic movement control of moving the vehicle 10 toward a predetermined direction by a predetermined distance (for example, the automatic parking-lot-leaving control) by the control unit 57 based on a recognition result of the movement path (step S33).

When the second registration is currently in execution in step S32 (step S32: Yes), the calculation unit 52 determines, by the control unit 57, whether the current second registration in execution is the second registration performed during the new registration (step S34). A case where it is determined that the second registration is in execution in step S32 (step S32: Yes) corresponds to, for example, a case where after the vehicle 10 is parked in the parking lot 72 and before the second registration is ended, the vehicle 10 is caused to automatically leave the parking lot 72 immediately, or a case where after the vehicle 10 is parked in the parking lot 72 and before the second registration is ended, the vehicle 10 is caused to manually leave the parking lot 72 immediately and the vehicle 10 is automatically parked in the parking lot 72.

When the current second registration in execution is the second registration performed during the new registration in step S34 (step S34: Yes), the calculation unit 52 continues the second registration of the new registration currently in execution without controlling the automatic movement of the vehicle 10 by the control unit 57.

When the current second registration in execution is not the second registration performed during the new registration, that is, when the second registration currently in execution is the second registration performed during the update registration in step S34 (step S34: No), the calculation unit 52 suspends, by the control unit 57, the updated second registration currently in execution (step S35). The calculation unit 52 proceeds to step S33, and performs the automatic movement control (for example, the automatic parking-lot-leaving control of causing the vehicle 10 to automatically leave the parking lot 72) by the control unit 57.

Next, execution timings for the first registration and the second registration performed by the control unit 57 of the calculation unit 52 and the automatic movement control (for example, the automatic parking-lot-leaving control) of the vehicle 10 parked at the designated parking position during the new registration and the update registration of the features of the designated parking position will be described with reference to FIGS. 11 and 12.

Figure 11:
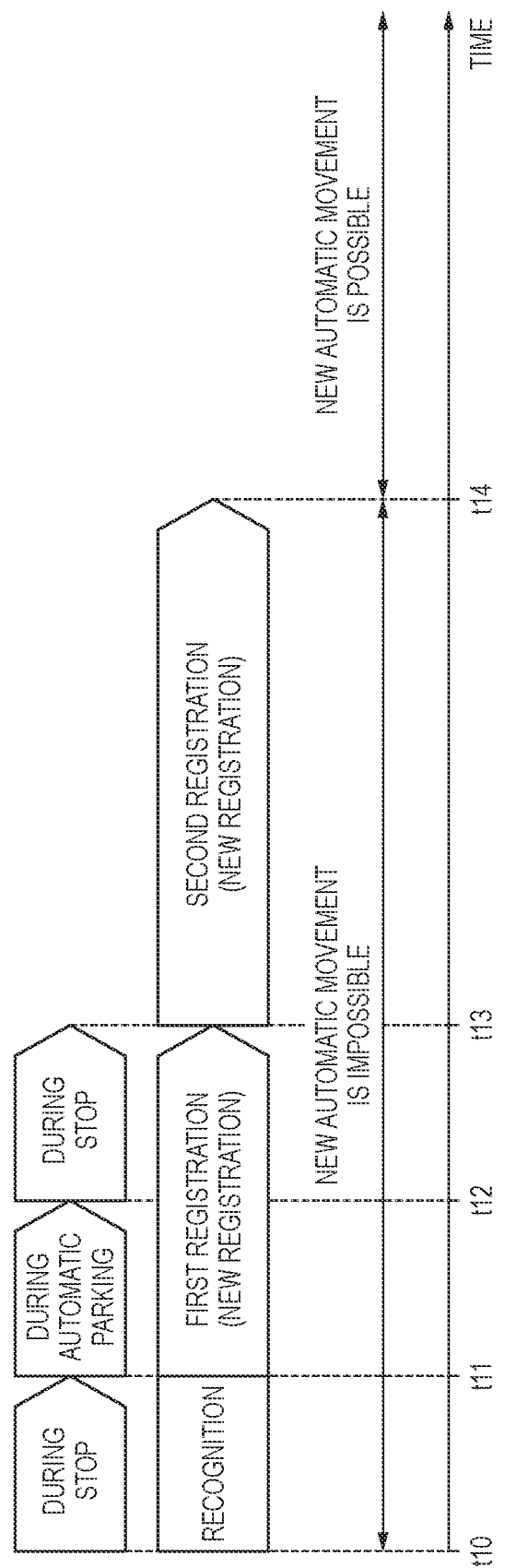
FIG. 11 is a time chart showing a relationship between first registration and second registration during new registration of features of a designated parking position and possibility of the automatic movement of the vehicle.

FIG. 11 is a time chart showing a relationship between the first registration and the second registration during the new registration of the features of the designated parking position and possibility of the automatic movement of the vehicle 10. As shown in FIG. 11, it is assumed that at a timing of time t10, the driver of the vehicle 10 stops the vehicle 10, for example, in front of the parking lot 72 at home and touches the new registration button 61 (see FIG. 4) to register the parking lot 72 as a new designated parking position.

When the new registration button 61 is touched, the calculation unit 52 acquires, by the external environment recognition unit 55, the recognition data of the external environment of the vehicle 10 imaged by the front camera 12Fr, the rear camera 12Rr, the left side camera 12L, and the right side camera 12R, and recognizes an object in the movement path to the parking position 76 by the control unit 57 based on the acquired recognition data.

When recognition of the movement path is ended, the calculation unit 52 starts the automatic parking control of moving the vehicle 10 by a predetermined distance in a predetermined direction toward the parking position 76 at a timing of time t11 by the control unit 57 based on a recognition result thereof. Further, in parallel with the automatic parking control of the vehicle 10, the calculation unit 52 executes, by the control unit 57, the first registration of detecting the features related to the parking position 76 from the first recognition data of the external environment acquired by the left side camera 12L and the right side camera 12R during the automatic parking, and newly registering the detected features in the storage unit 54. The vehicle 10 is in a state of being stopped in the parking lot 72 at a timing of, for example, time t12 at which the automatic parking is completed.

For example, it is assumed that the first registration of the new registration is ended at a timing of time t13. From a timing of the time t13 at which the first registration is ended, the calculation unit 52 starts the second registration of the new registration of detecting the features related to the parking position 76 based on the second recognition data of the external environment acquired by the rear camera 12Rr during the automatic parking of the vehicle 10 (a period from the time t11 to the time t12) by the external environment recognition unit 55, and additionally registering and correcting and registering the registered features newly registered in the first registration by using the detected features. It is assumed that the second registration of the new registration performed by the control unit 57 is ended at a timing of, for example, time t14.

When newly registering the features of the designated parking position, a period until the second registration is completed (until the time t14) is an automatic movement impossible period during which an instruction of a new automatic movement (for example, the automatic parking-lot-leaving) of the vehicle 10 is not received. Therefore, even if the driver of the vehicle 10 touches the automatic movement button (for example, the automatic parking-lot-leaving button) to issue the instruction of the automatic movement until the time t14 at which the second registration of the new registration is completed, the automatic movement of the vehicle 10 is not executed. In this case, the driver of the vehicle 10 may be notified that the vehicle 10 cannot be automatically moved until the second registration of the new registration is completed. Further, the driver of the vehicle 10 may be notified of time required until the second registration of the new registration is completed. Further, in the period during which the second registration of the new registration is executed, for example, the automatic movement button may be disabled or hidden. In the new registration of the features of the designated parking position, at and after the time t14 at which the second registration is completed, the instruction of the automatic movement of the vehicle 10 is received and the automatic movement is possible.

Figure 12:
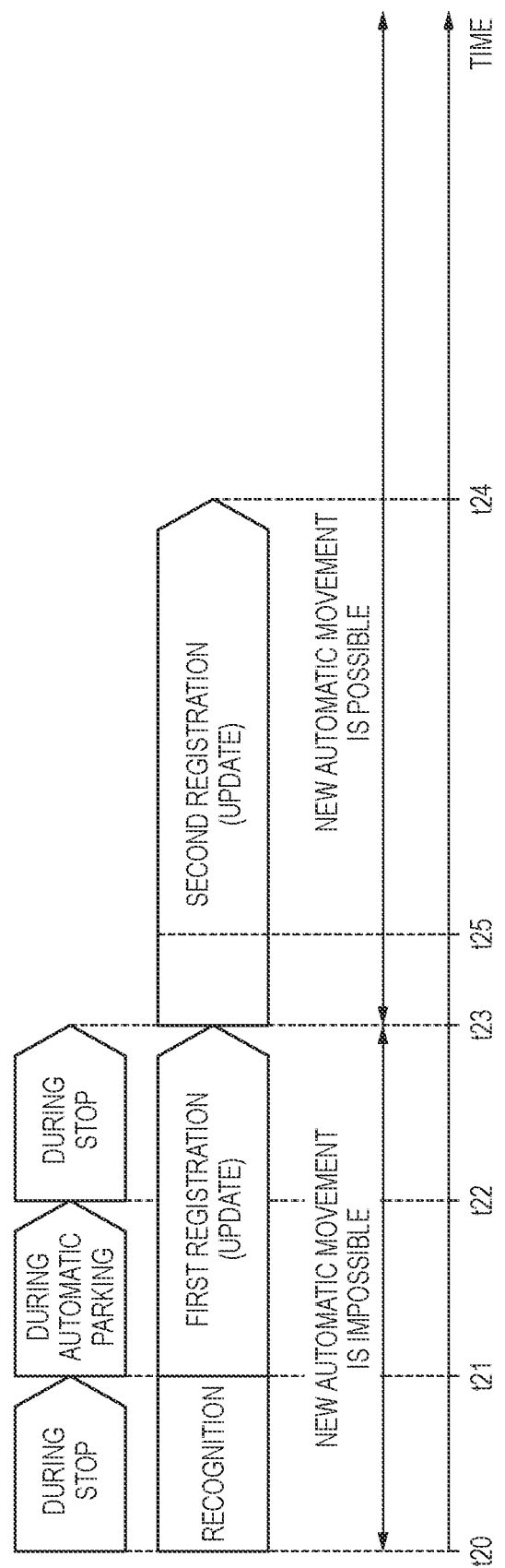
FIG. 12 is a time chart showing a relationship between the first registration and the second registration during update registration of the features of the designated parking position and the possibility of the automatic movement of the vehicle.

FIG. 12 is a time chart showing a relationship between the first registration and the second registration during the update registration of the features of the designated parking position and possibility of the automatic movement of the vehicle 10. As shown in FIG. 12, it is assumed that at a timing of time t20, the driver of the vehicle 10 stops the vehicle 10, for example, in front of the parking lot 72 at home, and touches the registered parking position image button 62 (see FIG. 4) to automatically park the vehicle 10 in the parking lot 72 as usual.

When the registered parking position image button 62 is touched, the calculation unit 52 acquires, by the external environment recognition unit 55, the recognition data of the external environment of the vehicle 10 imaged by the front camera 12Fr, the rear camera 12Rr, the left side camera 12L, and the right side camera 12R, and recognizes an object in the movement path to the parking position 76 by the control unit 57 based on the acquired recognition data. Further, the calculation unit 52 detects the features during execution based on the recognition data acquired by the front camera 12Fr, the rear camera 12Rr, the left side camera 12L, and the right side camera 12R by the control unit 57, and calculates a matching rate between the detected features during execution and the registered features registered for the parking position 76 of the touched registered parking position image button 62.

When recognition of the movement path is ended, the calculation unit 52 starts the automatic parking control of moving the vehicle 10 by a predetermined distance in a predetermined direction toward the parking position 76 at a timing of time t21 by the control unit 57 based on a recognition result thereof. Further, when the matching rate between the features during execution and the registered features calculated above is smaller than a predetermined threshold, in parallel with the automatic parking control of the vehicle 10, the calculation unit 52 performs, by the control unit 57, the first registration of detecting the features during execution related to the parking position 76 from the first recognition data of the external environment acquired by the left side camera 12l, and the right side camera 12R during the automatic parking, and updating the registered features registered so far for the parking position 76 to the features during execution. The vehicle 10 is in a state of being stopped in the parking lot 72 at a timing of, for example, time t22 at which the automatic parking is completed.

For example, it is assumed that the first registration of update is ended at a timing of time t23. From the timing of the time t23 at which the first registration is ended, the calculation unit 52 starts the second registration of update of detecting the features related to the parking position 76 based on the second recognition data of the external environment acquired by the rear camera 12Rr during the automatic parking of the vehicle 10 (a period from the time t21 to the time t22) by the external environment recognition unit 55, and additionally registering and correcting and registering the registered features updated in the first registration by using the detected features. It is assumed that the second registration of update performed by the control unit 57 is ended at a timing of, for example, the time t24.

When updating the features of the designated parking position, a period until the first registration is completed (until the time t23) is the automatic movement impossible period during which the instruction of the new automatic movement (for example, the automatic parking-lot-leaving) of the vehicle 10 is not received, and a period after the time t23 at which the first registration is completed is an automatic movement possible period during which the instruction of the automatic movement is received. Therefore, even in a period from the time t23 to the time t24 during which the second registration of update is executed, when the driver of the vehicle 10 touches the automatic movement button (for example, the automatic parking-lot-leaving button) to issue the instruction of the automatic movement, the automatic parking-lot-leaving control of the vehicle 10 is executed. For example, when the automatic movement button is touched at time t25 in the period from the time t23 to the time t24 during which the second registration of update is executed, the executed second registration of update is suspended and the automatic movement of the vehicle 10 is started. In this case, for example, the driver of the vehicle 10 may be notified that the automatic movement of the vehicle 10 is possible. Further, when the vehicle 10 is automatically moved, the driver may be notified that the second registration of update is suspended.

As described above, the control unit 57 of the control device continues the second registration without executing the automatic movement control when execution of the automatic movement control of the vehicle 10 is instructed from the driver of the vehicle 10 during execution of the second registration of newly registering the features related to the designated parking position 76, and suspends the second registration to execute the automatic movement control when the execution of the automatic movement control is instructed from the driver of the vehicle 10 during execution of the second registration of updating the features related to the designated parking position 76. According to the configuration, it is possible to prevent a situation in which a processing load of the control unit 57 (processor) may increase due to the second registration of the features related to the parking position 76 and the automatic movement control being simultaneously performed. Accordingly, it is possible to prevent a situation in which the registration of the features related to the designated parking position 76 and the automatic movement control are not normally executed due to overload of the control unit 57. Further, when execution of the automatic movement control is instructed during update of the designated parking position 76, the update is suspended to preferentially execute the automatic movement control, whereby usability can be improved.

The control unit 57 executes the first registration of registering the features related to the designated parking position 76 based on the first recognition data acquired by the left side camera 12L and the right side camera 12R, and the second registration of registering the features related to the designated parking position 76 based on the second recognition data that is detailed recognition data having a range narrower than that of the first recognition data and that is acquired by the rear camera 12Rr. Accordingly, the features related to the parking position 76 that cannot be acquired in the first recognition data imaged by the left side camera 12L and the right side camera 12R can be acquired based on the detailed second recognition data imaged by the rear camera 12Rr, and parking accuracy of the vehicle 10 can be improved.

The control unit 57 performs the first registration based on the first recognition data in parallel with the automatic parking control of the vehicle 10, and executes the second registration based on the second recognition data after the automatic parking control and the first registration are ended. Since the recognition of an object in the movement path of the vehicle 10 to the parking position 76 is ended before the automatic parking control of automatically parking the vehicle 10 at the designated parking position 76 is performed, the automatic parking control and the first registration of the vehicle 10 can be performed in parallel with each other. Further, the second registration of adding and correcting the features of the parking position 76 registered in the first registration is preferably executed after the first registration, and execution timing of the second registration is shifted, whereby it is possible to prevent a situation in which the processing load of the control unit 57 increases.

The control method described in the embodiment described above can be implemented by executing a control program prepared in advance by a computer. The present control program is recorded in a computer-readable storage medium and executed by being read from the storage medium. Further, the present control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that can communicate with the control device, or may be provided in a server device that can communicate with the control device and the electronic device.

The embodiment of the present invention has been described above, but the present invention is not limited to the embodiment described above, and modifications, improvements, and the like can be made as appropriate.

For example, in the embodiment described above, a case where the vehicle 10 is automatically parked by the automatic steering performed by the control unit 57 of the calculation unit 52 has been described, but the present invention is not limited thereto. For example, the present invention may be applied to parking assistance for providing assistance when the vehicle 10 is parked by an operation of the user.

In the embodiment described above, the parking position of the vehicle 10, and the features of the parking position and surroundings have been described using the top view images (combined images) of the front camera 12Fr, the rear camera 12Rr, the left side camera 12L, and the right side camera 12R, but the present invention is not limited thereto. For example, description may be made using an image captured by any one of the front camera 12Fr, the rear camera 12Rr, the left side camera 12L, and the right side camera 12R.

In the embodiment described above, a case where the control unit 57 displays the top view image 71 and the like on the touch panel 42 of the vehicle 10 has been described, but the present invention is not limited thereto. For example, the control unit 57 may display the top view image 71 and the like on a display screen of an information terminal (for example, a smartphone or the like) carried by the passenger of the vehicle 10 via the communication unit 24.

In the embodiment described above, a case where the feature map representing the registered features of the designated parking position is registered in the storage unit 54 of the vehicle 10 has been described, but the present invention is not limited thereto. For example, the information may be registered in a storage unit of another device such as a smartphone or a server communicably connected to the vehicle 10.

In the embodiment described above, a case where the user touches the registered parking position image button 62 (a case where the No. 1 image button 62a in FIG. 4 is selected and touched) when parking the vehicle 10 at the registered parking position has been described, but the present invention is not limited thereto. For example, in a case where the user touches the automatic parking button 60 displayed on the touch panel 42 when automatically parking the vehicle 10, the control unit 57 may automatically determine in which parking position the vehicle is to be parked this time by comparing the top view image captured during execution of the automatic parking with the registered top view image, and for example, start the processing in FIG. 9. Accordingly, the user of the vehicle 10 can eliminate an operation of finding and selecting a button for a parking position to be parked this time based on the registered parking position image button 62.

In the embodiment described above, an example in which the moving body is used as a vehicle (four-wheeled automobile) has been described, but the present invention is not limited thereto. For example, a vehicle such as a two-wheeled vehicle or a Segway may be used. Further, the idea of the present invention is not limited to the vehicle, and can also be applied to a robot, a ship, an aircraft, or the like that includes a drive source and that can be moved by power of the drive source.

In the present specification, at least the following matters are described. Corresponding constituent elements and the like in the embodiment described above are shown in parentheses, but the present invention is not limited thereto.

(1) A control device including:
an external environment recognition unit (the external environment recognition unit 55) configured to acquire recognition data of an external environment of a moving body (the vehicle 10);
a reception unit (the reception unit 56) configured to receive selection of a parking position from a user of the moving body; and
a control unit (the control unit 57) configured to execute automatic parking control for parking the moving body at the parking position based on the recognition data and the parking position and register the parking position as a designated parking position, in which
the external environment recognition unit acquires first recognition data and second recognition data different from the first recognition data as the recognition data, and
the control unit executes first registration of registering the designated parking position based on the first recognition data and second registration of registering the designated parking position based on the second recognition data,
the control unit continues the second registration without executing automatic movement control when execution of the automatic movement control of the moving body is instructed from the user of the moving body during execution of the second registration in new registration of the designated parking position, and
the control unit suspends the second registration and executes the automatic movement control when execution of the automatic movement control is instructed from the user of the moving body during execution of the second registration in update of the designated parking position.

According to (1), it is possible to prevent a situation in which a processing load of the control unit (processor) may increase due to the second registration of the designated parking position and the automatic movement control being simultaneously performed, and it is possible to prevent a situation in which the registration of the designated parking position and the automatic movement control are not normally performed. Further, when execution of the automatic movement control is instructed during update of the designated parking position, the update is suspended to execute the automatic movement control, whereby usability can be improved.

(2) The control device according to (1), in which
the second recognition data is recognition data having a range narrower than the first recognition data.

According to (2), it is possible to improve parking accuracy of the moving body by using the detailed recognition data having a narrow range.

(3) The control device according to (2), in which
the first recognition data is recognition data obtained by a side camera (the left side camera 12L, the right side camera 12R) of the moving body, and the second recognition data is recognition data obtained by at least one of a rear camera (the rear camera 12Rr) and a front camera (the front camera 12Fr) of the moving body.

According to (3), it is preferable to capture an image by the rear camera and the front camera of the moving body to acquire the detailed second recognition data having the range narrower than that of the first recognition data.

(4) The control device according to any one of (1) to (3), in which
the control unit executes the first registration in parallel with the automatic parking control, and
the control unit executes the second registration after the automatic parking control and the first registration are ended.

According to (4), it is possible to prevent a situation in which the processing load of the control unit may increase by shifting an execution timing of the second registration later.

(5) The control device according to any one of (1) to (4), in which
when the second registration is continued without executing the automatic movement control, the control unit notifies the user of the moving body that the automatic movement control is not executed due to the second registration.

According to (5), since a cause for not executing the automatic movement control is notified, the usability is improved.

(6) The control device according to (5), in which
when the second registration is continued without executing the automatic movement control, the control unit notifies the user of the moving body of time until the second registration is completed.

According to (6), since the time until the automatic movement control can be executed is known, the usability is improved.

(7) The control device according to any one of (1) to (6), in which
the control unit performs control of restricting an instruction operation of executing the automatic movement control during execution of the second registration in the new registration of the designated parking position.

According to (7), the second registration in the new registration can be reliably executed by restricting the operation of executing the automatic movement control.

(8) The control device according to any one of (1) to (7), in which
when execution of the automatic movement control is instructed from the user of the moving body during execution of the second registration in the update of the designated parking position, the control unit notifies the user of the moving body of at least one of the suspension of the second registration and the execution of the automatic movement control.

According to (8), since it is notified that the second registration is suspended or the automatic movement control of the moving body is executed, the usability is improved.

(9) The control device according to any one of (1) to (8), in which
the control unit notifies the user of the moving body that the automatic movement control is executed during execution of the second registration in the update of the designated parking position.

According to (9), since it is known that the moving body can be automatically moved, the usability is improved.

(10) The control device according to any one of (1) to (9), in which
the control unit updates the designated parking position according to a matching rate between registration information of the designated parking position and information obtained based on the recognition data during execution of the automatic parking control.

According to (10), since it is determined whether to execute the registration of the update according to the information matching rate with the registration information, an increase in the processing load of the control unit can be prevented.

(11) A control method performed by a control device including
an external environment recognition unit configured to acquire recognition data of an external environment of a moving body,
a reception unit configured to receive selection of a parking position from a user of the moving body, and
a control unit configured to execute automatic parking control for parking the moving body at the parking position based on the recognition data and the parking position and register the parking position as a designated parking position, the control method including:
acquiring first recognition data and second recognition data different from the first recognition data as the recognition data, the step being performed by the external environment recognition unit, and
executing first registration of registering the designated parking position based on the first recognition data and second registration of registering the designated parking position based on the second recognition data, the step being performed by the control unit,
continuing the second registration without executing automatic movement control when execution of the automatic movement control of the moving body is instructed from the user of the moving body during execution of the second registration in new registration of the designated parking position, the step being performed by the control unit, and
suspending the second registration and executing the automatic movement control when execution of the automatic movement control is instructed from the user of the moving body during execution of the second registration in update of the designated parking position, the step being performed by the control unit.

According to (11), it is possible to prevent the situation in which the processing load of the control unit (processor) may increase due to the second registration of the designated parking position and the automatic movement control being simultaneously performed, and it is possible to prevent the situation in which the registration of the designated parking position and the automatic movement control are not normally performed. Further, when execution of the automatic movement control is instructed during the update of the designated parking position, the update is suspended to execute the automatic movement control, whereby the usability can be improved.

(12) A non-transitory computer-readable storage medium storing a control program for a control device including
an external environment recognition unit configured to acquire recognition data of an external environment of a moving body,
a reception unit configured to receive selection of a parking position from a user of the moving body, and
a control unit configured to execute automatic parking control for parking the moving body at the parking position based on the recognition data and the parking position and register the parking position as a designated parking position, in which
the external environment recognition unit acquires first recognition data and second recognition data different from the first recognition data as the recognition data,
the control program for causing the control unit to execute processing of:
executing first registration of registering the designated parking position based on the first recognition data and second registration of registering the designated parking position based on the second recognition data,
continuing the second registration without executing automatic movement control when execution of the automatic movement control of the moving body is instructed from the user of the moving body during execution of the second registration in new registration of the designated parking position, and
suspending the second registration and executing the automatic movement control when execution of the automatic movement control is instructed from the user of the moving body during execution of the second registration in update of the designated parking position.

According to (12), it is possible to prevent the situation in which the processing load of the control unit (processor) may increase due to the second registration of the designated parking position and the automatic movement control being simultaneously performed, and it is possible to prevent the situation in which the registration of the designated parking position and the automatic movement control are not normally performed. Further, when execution of the automatic movement control is instructed during the update of the designated parking position, the update is suspended to execute the automatic movement control, whereby the usability can be improved.

What is claimed is:

1. A control device comprising:
    an external environment recognition unit configured to acquire recognition data of an external environment of a moving body;
    a reception unit configured to receive selection of a parking position from a user of the moving body; and
    a control unit configured to execute automatic parking control for parking the moving body al the parking position based on the recognition data and the parking position and to register the parking position as a designated parking position, wherein
    the external environment recognition unit acquires first recognition data and second recognition data different from the first recognition data as the recognition data, and
    the control unit executes first registration of registering the designated parking position based on the first recognition data and executes second registration of registering the designated parking position based on the second recognition data,
    the control unit continues the second registration without executing automatic movement control when execution of the automatic movement control of the moving body is instructed from the user of the moving body during execution of the second registration in new registration of the designated parking position, and
    the control unit suspends the second registration and executes the automatic movement control when execution of the automatic movement control is instructed from the user of the moving body during execution of the second registration in update of the designated parking position.

2. The control device according to claim 1, wherein the second recognition data is recognition data having a range narrower than the first recognition data.

3. The control device according to claim 2, wherein the first recognition data is recognition data obtained by a side camera of the moving body, and
    the second recognition data is recognition data obtained by at least one of a rear camera and a front camera of the moving body.

4. The control device according to claim 1, wherein the control unit executes the first registration in parallel with the automatic parking control, and
    the control unit executes the second registration after the automatic parking control and the first registration are ended.

5. The control device according to claim 1, wherein when the second registration is continued without executing the automatic movement control, the control unit notifies the user of the moving body that the automatic movement control is not executed due to the second registration.

6. The control device according to claim 5, wherein when the second registration is continued without executing the automatic movement control, the control unit notifies the user of the moving body of time until the second registration is completed.

7. The control device according to claim 1, wherein the control unit performs control of restricting an instruction operation of executing the automatic movement control during execution of the second registration in the new registration of the designated parking position.

8. The control device according to claim 1, wherein when execution of the automatic movement control is instructed from the user of the moving body during execution of the second registration in the update of the designated parking position, the control unit notifies the user of the moving body of at least one of the suspension of the second registration and the execution of the automatic movement control.

9. The control device according to claim 1, wherein the control unit notifies the user of the moving body that the automatic movement control is executed during execution of the second registration in the update of the designated parking position.

10. The control device according to claim 1, wherein the control unit updates the designated parking position according to a matching rate between registration information of the designated parking position and information obtained based on the recognition data during execution of the automatic parking control.

11. A control method performed by a control device including
    an external environment recognition unit configured to acquire recognition data of an external environment of a moving body,
    a reception unit configured to receive selection of a parking position from a user of the moving body, and
    a control unit configured to execute automatic parking control for parking the moving body at the parking position based on the recognition data and the parking position and register the parking position as a designated parking position, the control method comprising:
    acquiring first recognition data and second recognition data different from the first recognition data as the recognition data, the step being performed by the external environment recognition unit, and
    executing first registration of registering the designated parking position based on the first recognition data and second registration of registering the designated parking position based on the second recognition data, the step being performed by the control unit,
    continuing the second registration without executing automatic movement control when execution of the automatic movement control of the moving body is instructed from the user of the moving body during execution of the second registration in new registration of the designated parking position, the step being performed by the control unit, and
    suspending the second registration and executing the automatic movement control when execution of the automatic movement control is instructed from the user of the moving body during execution of the second registration in update of the designated parking position, the step being performed by the control unit.

12. A non-transitory computer-readable storage medium storing a control program for a control device including
    an external environment recognition unit configured to acquire recognition data of an external environment of a moving body, a reception unit configured to receive selection of a parking position from a user of the moving body, and a control unit configured to execute automatic parking control for parking the moving body at the parking position based on the recognition data and the parking position and register the parking position as a designated parking position, wherein the external environment recognition unit acquires first recognition data and second recognition data different from the first recognition data as the recognition data, the control program for causing the control unit to execute processing of:

executing first registration of registering the designated parking position based on the first recognition data and second registration of registering the designated parking position based on the second recognition data, continuing the second registration without executing automatic movement control when execution of the automatic movement control of the moving body is instructed from the user of the moving body during execution of the second registration in new registration of the designated parking position, and suspending the second registration and executing the automatic movement control when execution of the automatic movement control is instructed from the user of the moving body during execution of the second registration in update of the designated parking position.

\* \* \* \* \*